June 9, 1931. M. OSNOS 1,809,062
METHOD AND APPARATUS FOR MEASURING THE ACTIVE
COMPONENTS OF ELECTRIC QUANTITIES
Filed Jan. 25, 1927 3 Sheets-Sheet 2
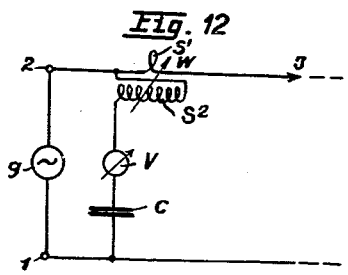
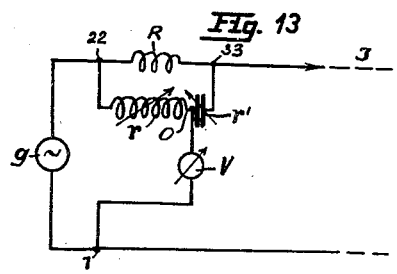
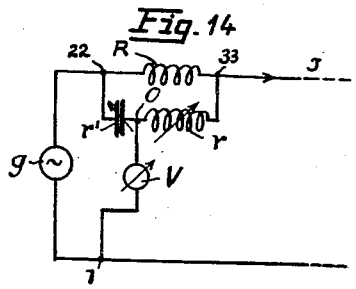
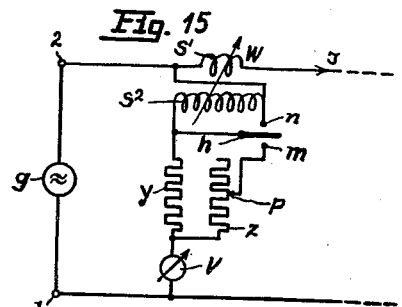
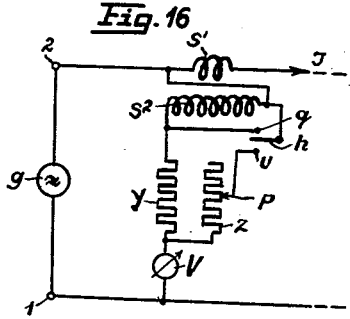
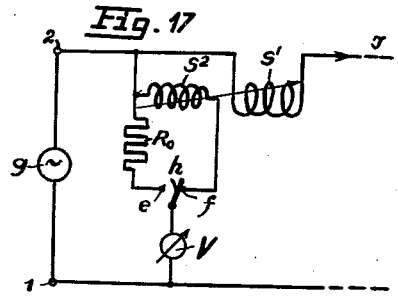
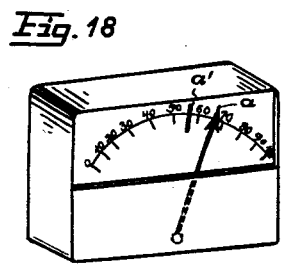
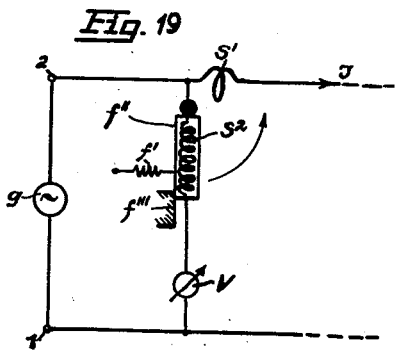
Inventor
MENDEL OSNOS
By: H.C. Grover
ATTORNEY Patented June 9, 1931

1,809,062

UNITED STATES PATENT OFFICE

MENDEL OSNOS, OF BERLIN, GERMANY

METHOD AND APPARATUS FOR MEASURING THE ACTIVE COMPONENTS OF ELECTRIC QUANTITIES

Application filed January 25, 1927, Serial No. 163,548, and in Germany February 4, 1926.

Broadly my invention covers methods and arrangements adapted to measure active and real components of electrical quantities, that is to say either currents or voltages. My invention is applicable both for low frequency work as well as, and most particularly so for radio frequency work. By means of my invention it is possible to determine power in a similar way as is done in direct current work, in other words without the use of wattmeters, that is, simply on the basis of the figures found for the current, and the active voltage, or the voltage and the active current as the case may be.

A novel feature of the invention consists in that the measuring instrument, in addition to the quantity whose active component is to be measured, (that is apart from the voltage or the current as the case may be) is supplied with another auxiliary component thereof which bears a known phase relation to the other reciprocal electrical quantity, that is current or voltage as the case may be, being for instance in quadrature therewith.

For the sake of better understanding of the underlying idea of my invention the essential features of the method shall first be described for the particular case where the electrical quantity whose active component is to be ascertained is a voltage.

The novel features which I believe to be characteristic of my invention are set forth with particularity in the appended claims.

My invention itself, however, both as to its organization and method of operation will best be understood by reference to the following description taken in connection with the accompanying drawings, in which:

Figures 1, 2 and 3 represent diagrammatically three systems to which the invention may be applied;

Figures 4 and 5 graphically illustrate conditions of the energy in the circuit, the former for leading current and the latter for lagging current;

Figure 6:
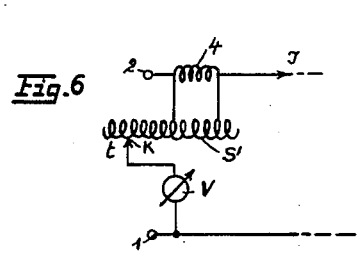
Figure 6 shows one practical embodiment of the invention.
Figure 7:
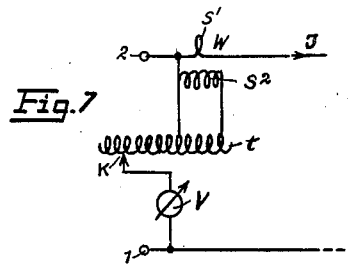
Figure 7 is somewhat similar to Figure 6, except that in this case a different mode of deriving the auxiliary component is shown.
Figure 8:
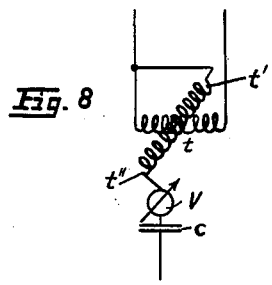
Figure 8 illustrates another embodiment of the invention in which the voltage drop is compensated by a condenser.
Figure 9:
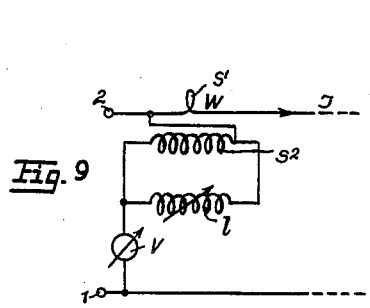
Figure 10:
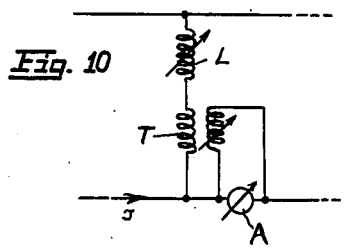
Figure 11:
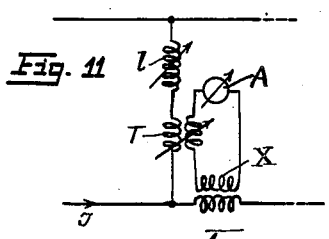
Figure 20:
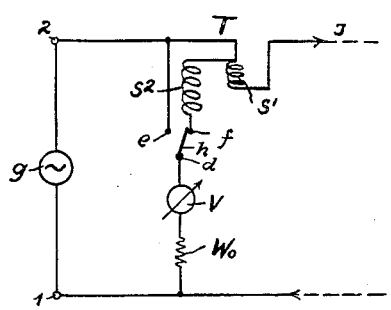
Figure 21:
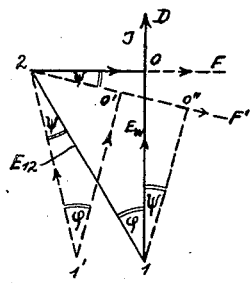
Figure 22:
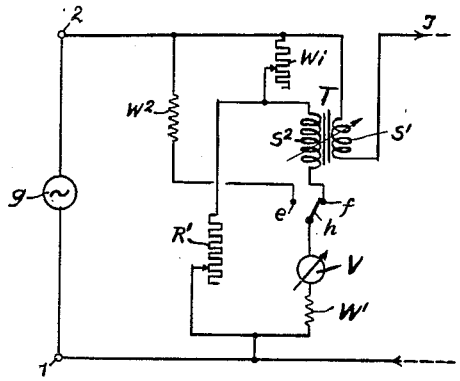
Figure 23:
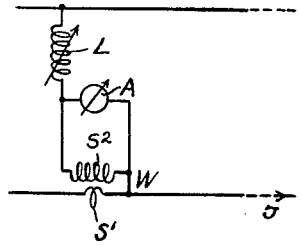

Figure 9 utilizes a variable inductance for obtaining the component;

Figures 10 and 11 illustrate a system in accordance with the invention for measuring active current components;

Figure 12 shows the invention as applied for the results obtained by Figures 6, 7 and 8, but in a more simplified form;

Figures 13 and 14 illustrate still another simplified system;

Figures 15, 16 and 17 illustrate practical modifications of the invention;

Figure 18 shows one means of obtaining the minimum voltage or current reading;

Figure 19 illustrates an improved system in which the voltmeter is permanently connected to the secondary of the transformer;

Figure 20 shows similar means as in the case of Figure 17 excepting in a more simplified manner;

Figure 21 graphically illustrates the condition of these circuits for different phase relations;

Figure 22 shows a system in which the conditions illustrated in Figure 21 might be embodied; and Figure 23 shows a more efficient system for eliminating certain drawbacks found in the other modifications.

Figure 1:
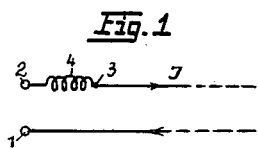
Figure 2:
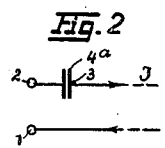
Figure 3:
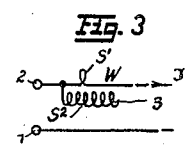

The assumption shall be made that the power or the active voltage shall be determined between points 1 and 2 of Figures 1, 2 and 3. If as is mostly true of radio frequency installations, an inductive or a capacitive element is located directly in the rear of the said points, see for instance Figures 1 and 2 respectively, the voltage drop caused by such element may be used in accordance with the disclosure of the present invention. In the absence of such elements however, or in case they are not accessible proper elements may be added. A better plan especially to be recommended for low frequency installations is to take off the requisite voltage in quadrature to the current as shown in Figure 3 from the secondary winding of a current (instrument) transformer W of the type customarily employed for the measurement of large currents. Such a transformer usually consists of only a few conductors (turns), or merely of one straight conductor representing the primary member or system and several secondary turns. In this latter case of course, one end of the secondary winding of the current transformer must be connected with the corresponding primary circuit.

Figure 4:
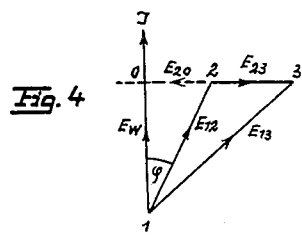
Figure 5:
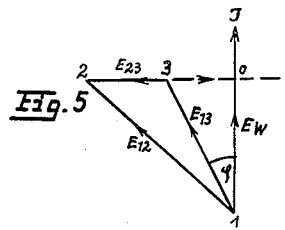

The voltage distribution for the case of leading currents is vectorially illustrated in Figure 4, and for the case of lagging currents in Figure 5. Referring to these graphs, E—12 and E—23 and E—13 represent the vectors of crest (amplitude) voltages for effective RMS voltages between points 1, 2 and 2, 3 and 1, 3 respectively of the installation. The voltage E—23 as pointed out is at right angles (quadrature) with reference to the current I. Hence the straight line 23 cuts off a section 1, 0 upon the straight line representing the direction of the current, and the said section represents the desired active component of the voltage.

Thus if the values of voltages E—12, E—23 and E—13 have been measured by means of a voltmeter, the voltage triangle 1, 2, 3, is determined, the height 01 of which can be easily determined by calculation or graphically, and this represents the desired active component of the voltage $Ew$.

The procedure of ascertaining the active component of the voltage when the voltage drop 2—3 bears some known relation other than a quadrature relation to the current is similar. In such a case after the shape of the voltage triangle 1, 2, 3 has been ascertained, the current vector quantity is traced so that the known phase angle is formed with reference to the voltage drop E—23. The projection of the voltage vector quantity E—12 upon the current vector quantity results in the desired active component of the voltage.

The main purposes of this invention are (1) to considerably simplify the above problems so that all calculus and graphic manipulations are dispensed with; (2) that further, not three but only one voltage measurement is necessary; and (3) that the active component of the voltage is read off directly on the voltmeter. A procedure of this kind will always be practicable if arrangements are so made that the auxiliary voltage whose phase relation to the current is known is chosen just so that it compensates the inactive or idle component of the voltage whose active component is to be sought.

More clearly, the voltage between 1 and 2 Fig. 3 may be considered as the vector sum of two components, one in phase with the current and called the working voltage, which incidentally is the one that we want to determine and the other 90° out of phase.

It will be seen that by the use of an adjustable mutual inductance there may be introduced an adjustable voltage 90° ahead or behind the current. If this is adjusted equal and opposite to the component 90° out of phase mentioned above, the latter is neutralized and the voltmeter measures only the working voltage. Thus all that need be done is to vary the mutual inductance until a minimum reading on the voltmeter is obtained. This minimum reading will be the desired value.

Fig. 6 shows a fundamental scheme of such an arrangement. Referring to said figure, the voltage bearing a quadrature relation to the current, say for instance the inductive voltage drop of an inductance coil S' is impressed upon the primary winding 4 of a tranformer which is preferably of the single coil type. The other part of the transformer has a voltage which is proportional to and in phase with said voltage drop. If a contact slide K of the voltmeter is shifted along this part of the transformer, then referring to Figure 4 or 5 the end of the vector of the voltage across the voltmeter will be shifted along the continuation of the line 2—3 and in the presence of a definite position of the contact slide the voltmeter will show a minimum voltage reading 1—0 which represents the desired active component of the voltage, $Ew$.

Fig. 7 illustrates the same arrangement of the voltmeter with this sole difference that in this case the voltage drop at right angles to the current is not derived from an inductance inserted in the line system, but rather from the secondary winding of a current transformer W.

The shifting of a contact slide along the transformer winding involves the disadvantage that the alteration of the auxiliary voltage of the voltmeter is not gradual, and that the short circuiting of the turns in case of bridging their taps by the contact must be prevented by more or less complicated contact devices.

It is therefore a better plan to have recourse to a practical construction of the transformer as shown in Fig. 8 comprising a fixed coil $t$ and a rotary coil $t'$ $t''$ connected with coil $t$ at the end $t'$ thereof, while the end $t''$ is connected with the voltmeter V. In this scheme, the desired minimum voltage reading of the voltmeter is adjusted in a very smooth and simple manner by merely turning the mobile coil $t'$ $t''$. This arrangement moreover, offers the advantage that in the presence of a sufficient number of turns in the rotary coil the desired setting to minimum voltage reading of the voltmeter is possible without any change of circuit connection or direction, regardless of whether the case of leading currents or of lagging currents is dealt with. (See Figs. 4 and 5 respectively.)

As regards accuracy of the results it is necessary that the voltmeter current should not cause any voltage drop in the transformer appreciably deviating from the idle voltage. Hence, the same should be sufficiently small. It may, under certain circumstances, be also a good plan to provide a condenser in the voltmeter circuit, as indicated in Fig. 8 by C. This condenser is used for the purpose of compensating said voltage drop.

Instead of using a transformer for the adjustment of the auxiliary voltage to the amount of the negative idle voltage, another scheme would be to employ a regulable inductive shunt. An arrangement of this nature is illustrated in Fig. 9 where a variable inductance coil, a variometer, $l$, is connected in parallel to the current transformer W preferably to its secondary winding $S^2$.

In what precedes, the essential features of the present invention have been described by reference to the special case where the electrical quantity whose active component was to be measured, consisted of a voltage. The method and the means adapted to practice the same in the other special case where the active component of the current is to be ascertained, is quite similar to what has been described above. This is evident when it is considered that the projection of the current upon the voltage results in the active component of the current in the same manner as the projection of the voltage upon the current results in the active component of the voltage. It will be seen therefore, that a logical reciprocity exists between the terms "current" and "voltage". Thus all that need be done in the above description in order to make it readily applicable to the measurement of the active component of currents is to interchange the terms "current" and "voltage" and, to use an ammeter instead of a voltmeter as the measuring instrument, to substitute parallel connections for series connections and vice versa, seeing that the addition or integration of voltage is effected by series arrangement and the addition of currents by parallel connection. For instance, referring to Figure 10, a corresponding circuit arrangement adapted to the measurement of the active component of the current can be readily obtained by changing Figure 6 in the above manner, A being then an ammeter, L, an adjustable impedance, and T, an adjustable element of transformer action. The auxiliary current supplied to the ammeter A and superposed upon the main current bears here a certain phase relation to the voltage, if desired, in quadrature, so that, in the presence of proper adjustment, the same is made to compensate the idle or wattless component of the main current in the ammeter, so that the active component may here be read readily by the minimum indication of the ammeter.

Instead of connecting the ammeter directly with the line, connection may be established by way of a current transformer X as shown in Figure 11.

It will be seen from what precedes that the essential feature of the invention generally resides in that for determining the active component of any desired electrical quantity of the line system, either voltage or current, the measuring instrument is supplied with an auxiliary component in addition to the electrical quantity whose active component is to be determined, said auxilary component, bearing a known phase relation to the other reciprocal electrical quantity, (current or voltage as the case may be), being most preferably in quadrature.

Instead of varying the auxiliary component by means of a separate regulating transformer, it may be varied by varying the coupling ratio of the transformer W (Fig. 12). A system of this type is shown in connection with Figure 12, where ($g$) is an alternating current generator, the terminals of which are 1 and 2, $S'$ and $S^2$ are respectively the primary and the secondary of the transformer, V is the voltmeter and C is a condenser by which the self induction in the voltmeter circuit is compensated completely or substantially. The condenser C may be dispensed with if the ohmic resistance of V is much superior to the self induction in its circuit. The auxiliary component is derived from the secondary $S^2$ and made to compensate the wattless component by varying the coupling ratio of W. This system is much more simplified than the circuits shown in Figures 6, 7 and 8.

Figures 13 and 14 illustrate other simplified systems for compensating the wattless component. The auxiliary component is taken from a point which is intermediate a variable inductive resistance $r$, and a capacitive resistance $r'$ in a circuit 22, 33, which bridges an apparent resistance R in the J line, which may be inductive as shown by 4 in Figure 1. The inductive resistance $r$ may be a rotary variometer and is so adjusted that the voltage between 1 and 0 becomes a minimum. The capacity $r'$ may also be variable instead of, or together with, resistance $r$.

In Figure 14 is shown a system in which the positions of the resistance $r$ and the capacity $r'$ are reversed, but said figure is otherwise similar to Figure 13. This reversing of the position necessitates a variation in the dimensions of the circuit in question. This also follows from the diagram of Figure 4, where the terminal voltage E—1 2 lags with respect to the current in the J-line and that the apparent resistance R between the point 22 and 33 is inductive. The voltage drop E 2 3 in the resistance R will then lag by 90° with respect to the current J, that is from the left to the right.

With the connection shown in Figure 13, the wattless component E 20 of the voltage which points to the left, is supplied by the inductance $r$. The voltage drop E—20 must therefore be directed opposite to the voltage drop E—23. This is only possible if the current in the branch $r$, $r'$ is directed opposite to the current of the resistance R. In this case the branch $r$, $r'$ must be of capacitive character, that is the capacitive impedance of $r'$, must exceed the inductive impedance of $r$.

On the other hand with the connections shown in Figure 14, the capacity, $r'$ will effect the voltage from E 20 pointing to the left, consequently in this case the current of the branch $r$, $r'$ must be of the same direction as that of R, the branch $r$, $r'$ is of inductive character, that is, $r'$ is smaller than $r$.

The selection of the system which is to be preferred in a given instance is of course determined by the conditions of the case. For instance, when it is desired to measure the active voltage of an alternating current generator $g$, and the system is a high frequency plant under varying loads it must be considered that in such plants the phase angle generally becomes more favorable with increasing loads so that the wattless component becomes smaller. Consequently, if the resistance in the branch 22, 33 has been set for a certain load, it must be reset for increasing loads so that its resultant resistance increases also. In the case shown in Figure 13 where the resultant impedance is $r'—r$, it will increase when $r$ is reduced, whereas in Figure 14, $r$ must be increased to increase the resultant impedance. It is apparent that $r$ is readily reduced by a rotary variometer, but not so readily increased as the variometer often is not equal to the duty and so the system in Figure 13 is generally preferable in the case considered when the regulation is effected by varying the inductance.

In all the systems described so far, it is preferred to arrange a condenser in the voltmeter circuit to compensate its self induction. A condenser, however, is eliminated in the systems of Figures 16 and 17 by suitably varying the resistance in series with a voltmeter. Preferably an additional variable resistance is combined with the normal series resistance of the voltmeter and is so adjusted that the increase of impedance due to the self-inductance in the circuit of the voltmeter V is compensated by the reduction of the series resistance. As the reading of the voltmeter is not a function of the phase but of the absolute quantity of its current, the voltmeter will indicate correctly with the described correction of the impedance.

Referring now to Figure 15, the auxiliary voltage component is supplied to the voltmeter V from the secondary $s^2$ of the current transformer $w$, the coupling ratio of which may be varied until the voltmeter V will indicate minimum voltage. In this case, $y$ is the normal series resistance in the voltmeter circuit. The increase of impedance caused by the self-induction of the secondary in the voltmeter circuit is compensated by the additional or correcting resistance $z$ which is set by means of a sliding contact $p$ as follows:

First, under no load condition, the switch $h$ is placed on the contact $n$ cutting out the resistance $z$ from the voltmeter circuit, and also the secondary, the voltmeter V being now connected to the wire J over its series resistance $y$ and indicating the voltage between the terminals 1 2. Now, still under no load conditions the switch $h$ is thrown over to the contact $m$ cutting in the secondary self inductance which tends to reduce the voltmeter current. This is counteracted by the resistance $z$ which is now connected in parallel to the series resistance $y$. If the resistance $z$ has been set correctly, the current in the voltmeter circuit will not vary when the switch or plate is thrown over, that is, its indication will not vary. If it does vary the resistance must be reset.

The resistance may be a reactance or an ohmic resistance, but the latter type is preferable.

In the diagram Figure 16, the resistance is connected in parallel to the coil $s^2$ and the series resistance $y$, instead of being connected in parallel to the series resistance alone. The switch $h$ is adapted to alternately cooperate with a contact $q$ and a contact $u$.

Referring now to Figure 17, $s'$ and $s^2$ are the primary and secondary of a transformer, the coupling ratio of which is variable. The series resistance of the voltmeter V is not shown for the sake of clearness. $R_0$ is preferably an ohmic resistance for correcting the indication of the voltmeter V, which incorrect indication is due to the voltage drop consequent upon the stray and ohmic resistances of the secondary. To measure the entire voltage of the generator $g$, the switch $h$ is placed on the contact $e$ and to measure the active voltage of the generator it is thrown over to the contact $f$ and the coupling of the transformer is varied until the indication of the voltmeter is at a minimum.

It is also possible to actuate the secondary by the dynamic action of the current flowing in both coils. By the motion of the secondary the coupling ratio is caused to vary from zero to a maximum and there will be a relative position of the two coils where the wattless component is just compensated and the voltmeter indicates a minimum voltage.

The motion of the secondary should be gradual so that the voltmeter V will have time to reach the minimum indication corresponding to the existing minimum voltage. The motion of the coil may be retarded by any suitable means, not shown, for instance oil damping, a dash pot or the like.

To facilitate the reading of the minimum voltage or current, the minimum indication of the voltmeter or ammeter as the case may be, should be held automatically so that the operator is not under the necessity of permanently having an eye on the indicator of the instrument. As shown in Figure 18 a trailing indicator $a'$ may be connected with the main indicator, $a$ which will follow the main indicator only when it moves towards lower voltage.

Apparatus of this kind may be improved further by holding the movable part of the transformer in a normal position, for instance, by a spring. With the movable part in its normal position the voltmeter will indicate the entire voltage at a given point of the system, and, when moved out of such a position until the voltmeter indicates minimum it will indicate the active voltage component or the active current component if an ammeter is provided instead of a voltmeter.

For instance, in the system shown in Figure 17 the voltmeter V will indicate the voltage or its active component if connected with the secondary by the switch $h$. In the improved system of Figure 19 the switch is eliminated, the voltmeter being permanently connected to the secondary. When the secondary is in its normal position, the mutual inductance between the primary and the secondary is zero. The secondary is carried in a casing $f''$ which is fulcrumed at the top and is held in the normal position by a spring $f'$ and an abutment $f'''$. The voltmeter now indicates the voltage of the binding posts 1 and 2 of the generator $g$. When the casing $f''$ is turned anti-clockwise as indicated by the arrow, until the voltmeter indicates a minimum and is then allowed to return to its normal position, the voltmeter will now indicate both the generator voltage and the active voltage as the latter is marked permanently by its trailing indicator $a'$.

It is not always practicable to obtain the active component of the auxiliary voltage in phase with the wattless component. For instance, if the voltage component is derived from an iron core transformer which is sometimes desirable particularly with low frequency current as the size and the primary copper losses of the transformer are reduced, the iron loss of the transformer causes the auxiliary component to become distorted in phase from the wattless component.

The influence of the phase distortion will now be explained with reference to Figures 20 and 21. The system shown in Figure 20 is substantially similar to that of Figure 17. T is a series transformer, Wo is a series resistance in the circuit of the voltmeter V. If the transformer T is without loss the active voltage is measured as shown in Figure 21 in full lines where 1—2 is the vector of the voltage, E 1—2 as in Figures 4 and 5, and 1—D is the vector of the current J, and 1—0 is the resultant voltage which acts on the voltmeter V. When the auxiliary voltage is made 2—0 by suitable setting of the transformer the active voltage will be 1—0 or E$w$ and the voltmeter will indicate the minimum.

On the other hand. with iron losses in the transformer, the voltage in the secondary coil will be distorted through an angle $\psi$, the loss angle from the line 2—F and its vector is now 2—F'. The minimum indication of the voltmeter (V) will now be 1—0'', but this does not indicate the real value of the active voltage because it will be noted the angle of the minimum voltage vector with the hypotenuse 1, 2 of the vector triangle is $\phi+\psi$ and not $\phi$. If it were possible to distort the hypotenuse 1, 2 for the loss angle, the triangle would be 1' 2 0', which is similar to the triangle 1 2 0, so that the minimum indication 1' 0' could be used for measuring the active voltage.

A system in which this function may be performed is shown in Fig. 22. The transformer (T) in this case has an iron core. The part of the voltmeter current which is caused by the voltage E12 is in the development described distorted from this voltage by the same angle for which that part of the voltmeter current which is generated by the auxiliary component is distorted from the wattless voltage component. To this end a preferably adjustable resistance R' is connected in parallel to the voltmeter (V) and the secondary $s^2$ and another adjustable resistance $wi$ is connected in series with both the above mentioned branches in one of which there is the resistance R'. The series resistance of the voltmeter is subdivided into two units, $w'$ and $w^2$, the latter being connectd with contact ($e$) of the switch ($h$). When the switch $h$ is on the contact ($e$) the entire resistance $w'+w^2$ is cut in but when ($h$) is on the contact ($f$) only the resistance $w'$ is in the circuit of the voltmeter and is completed by the ohmic and inductive resistance of the secondary. By suitably varying the resistance $wi$ and (R') the desired equalization of the distortion of the voltmeter current may be effected for any conditions.

In normal non-static voltmeters, the motion of the indicator is a function of the voltmeter current. A voltmeter, in fact, is a high resistance ammeter for high voltages and small currents. As a rule, the series resistances have a comparatively small self induction so that the voltmeter current does not differ much in phase from its voltage and therefore may represent the voltage as to quantity and phase. In Figure 20 with a loss-free transformer, each part current flowing in the voltmeter is at the same ratio as to quantity and phase as the voltages by which they are caused. With the iron core transformer in Figure 22, however, that part current which is caused by the terminal voltage (E—12) has to overcome another resistance than that part current which comes from the secondary ($s^2$). In this case, therefore, the resistance (R') and (wi) must be so set that the first mentioned part current is distorted as against the terminal voltage through the same angle for which the second mentioned part current is distorted as against the real wattless component. Then, the two part currents will represent correctly the voltage sum in question. Consequently, if the part current caused by the secondary voltage of the transformer differs from the secondary voltage by an angle say X when plotted and consequently from the actual wattless component by an angle X+$\psi$, the part current generated in the voltmeter, by the voltage E—12 will differ from the same angle from its own voltage. In order to have a greater range of variation the series resistance w' may be made adjustable or an adjustable ohmic or inductive resistance may be provided in the voltmeter circuit.

Generally, the results of the correcting arrangement described are very accurate. The loss angle $\psi$ may slightly vary with the current J but the angle is so small that variations will not amount to much. However, the variations may be corrected by adjusting the resistance R' or an additional ohmic or inductive resistance to the voltmeter circuit in accordance with the variation of the current J.

When the primary s' is under the current J the iron saturation and the loss angle will increase with increasing current. The loss angle might be rendered comparatively constant by so determining the size of the transformer that its iron is saturated for small values of J, but it is better to maintain the number of ampere windings in the transformer as constant as possible. This may be effected by supplying to the primary not the current J but a current which is equal to that current in phase but as constant in magnitude as practicable. Any suitable means known in the electrical art may be provided for this purpose.

In this method the iron saturation and the loss angle are constant.

Preferably the iron transformer T is designed so that its stationary and movable parts are similar to the stator and the rotor of a dynamo or motor, but with a small air gap. If the number of its primary windings is maintained practically constant, as described, its secondary voltage is determined by the angle of rotation of its rotor so that the angular displacement of the rotor may be a measure of the wattless voltage, and, with practically constant voltage E—12 the phase angle of current and voltage.

Another drawback may become evident when using iron in the system of Figure 11 where A is an ammeter. If in such a system the current transformer $x$ is made with iron for reducing its size, the core may become hot, particularly with high frequency. As a rule this will not occur with the usual connection of the ammeter where the secondary of the transformer is short circuited by the ammeter as the field of the transformer is quite small on account of this secondary short circuit. However, in Figure 11, the transformer $x$ is not connected directly to the ammeter but is in series with the secondary of the second transformer T. Therefore, the secondary terminal voltage of the transformer $x$ is larger than with a direct short circuit, the field is not altogether dead, but may cause undesirable heating of the iron.

This drawback is eliminated in the system of Figure 23 where the transformer T is eliminated as the secondary of the transformer $w$ is directly connected to the ammeter A. In this system as well, two currents flow in the ammeter, one from the transformer $w$ and the other from the self inductance L the former being of the same phase as the current J and the other being in phase with the wattless component. In this manner the wattless component in the ammeter circuit is balanced as before, so that it will give a minimum indication corresponding to a pure active component. With this system the secondary of $w$ is short circuited directly through the ammeter and the transformer $w$ will not become hot.

While I have shown and described a number of embodiments of my invention, I desire that only such limitations shall be imposed thereupon as are indicated in the appended claims. In said appended claims, by electrical quantities I desire to be understood as meaning voltage or current as the case may be and by ordinary measuring instruments I desire to be understood as meaning voltmeters or ammeters respectively.

I claim as my invention:

1. In a device for determining the active component of an electrical quantity of an alternating current electrical system, an ordinary measuring instrument, means for supplying said instrument with the electrical quantity whose active component is to be determined and means comprising a variable coupling device intermediate said measuring instrument and said electrical system for supplying said instrument with an auxiliary like electrical quantity bearing a known phase relation with said first mentioned electrical quantity.

2. In a device for measuring the active voltage component of an alternating current system by the use of a voltmeter, means comprising the secondary of a transformer connected in said system for supplying said voltmeter with an auxiliary voltage bearing a known phase relation with the current in said system, said auxiliary voltage being equal and opposite to the inactive voltage component.

3. A method for measuring the active voltage component in an alternating current system with an ordinary voltmeter which comprises supplying said voltmeter with the voltage whose active component it is desired to measure and also with an auxiliary voltage derived from said system and bearing a known phase relation to the current in said system.

4. A method for determining the active component of an electrical quantity in an alternating current system with an ordinary measuring instrument which comprises supplying the measuring instrument utilized with an auxiliary quantity equal and opposite to the inactive component of the electrical quantity whose active component is to be determined in addition to said electrical quantity whereby, the inactive component is neutralized.

5. A method for determining the active component of an electrical quantity of an alternating current system with an ordinary measuring instrument which comprises supplying the measuring instrument utilized for measuring the quantity desired with an auxiliary quantity in addition to the electrical quantity whose active component is to be determined, said auxiliary quantity bearing a known phase relation to the other of said electrical quantity whereby the active component may be read directly.

6. In an alternating current system, an alternating current generator for supplying energy therein, means for measuring the active voltage component of said energy, comprising a transformer having its primary connected in series with said generator, a voltmeter in series with the secondary of said transformer, said voltmeter and secondary winding being in shunt with said generator, and means for varying the coupling ratio between said primary and said secondary of said transformer.

7. In an alternating current system, an energy source, means for measuring the active voltage component of said energy, comprising a transformer having its primary connected in series with said energy source, a voltmeter in series with the secondary of said transformer, said voltmeter and secondary being in shunt with said energy source, a condenser connected in series with said voltmeter of a value so as to neutralize the self-induction of said voltmeter in series therewith, and means for varying the coupling ratio of said transformer.

8. In an alternating current system, an energy source for supplying energy therein, means for measuring the active voltage component thereof, comprising a voltmeter in shunt with said energy source, and means comprising a transformer device connected in said system for supplying said voltmeter with an auxiliary voltage component equal and opposite to the wattless voltage component.

9. In a device for determining the active component of an electrical quantity of an alternating current system, an ordinary measuring instrument, means for supplying thereto the said electrical quantity and means for supplying to said instrument an auxiliary like electrical quantity bearing a known phase relation to the other electrical quantity of said system whereby the inactive component of said first quantity is neutralized.

10. In a device for determining the active component of an electrical quantity of an alternating current system, in combination an ordinary measuring instrument, means for supplying thereto the said electrical quantity and means comprising a transformer for supplying to said instrument an auxiliary like electrical quantity bearing a known phase relation to the other electrical quantity of said system, means for varying the value of said auxiliary electrical quantity and means for indicating the value thereof which neutralizes the inactive component of said first quantity.

In testimony whereof I have signed my name to this specification.

MENDEL OSNOS.